July 5, 1932.  F. E. ADAMS  1,866,444
ATTACHMENT FOR AUTOMOBILES
Original Filed June 26, 1929   3 Sheets-Sheet 1
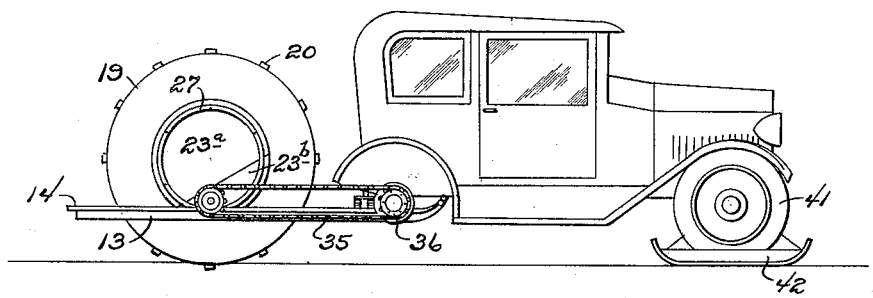
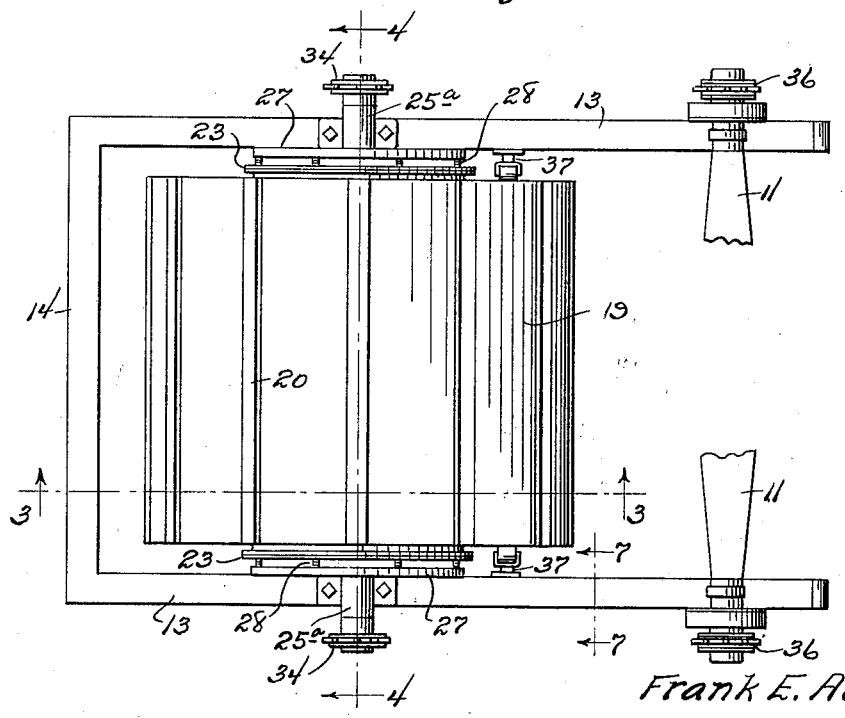
Frank E. Adams
INVENTOR
BY Victor J. Evans
ATTORNEY

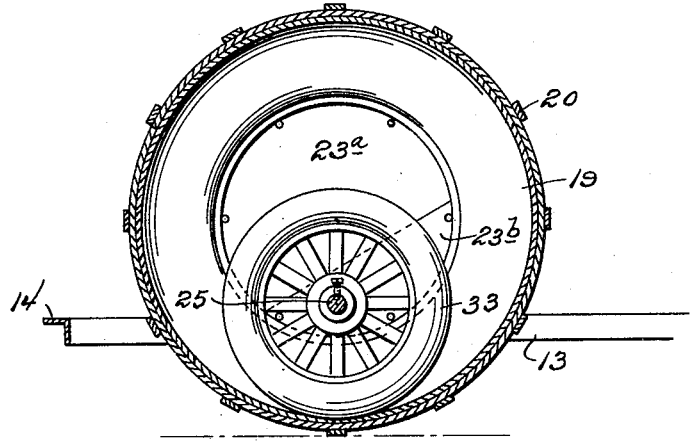
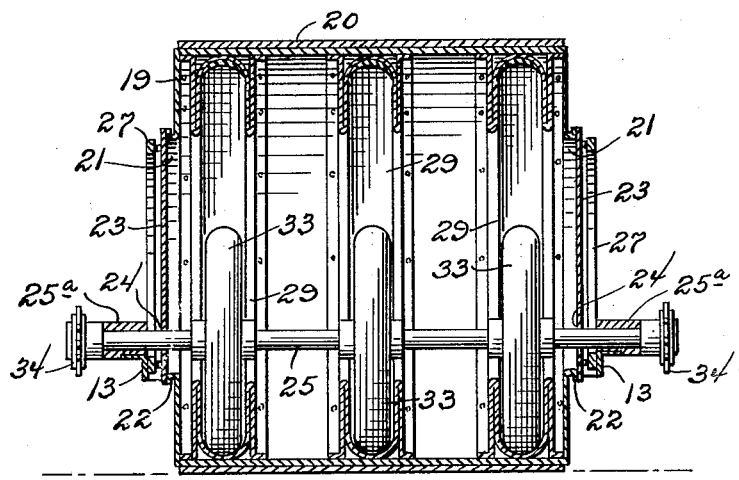

July 5, 1932.  F. E. ADAMS  1,866,444
ATTACHMENT FOR AUTOMOBILES
Original Filed June 26, 1929  3 Sheets-Sheet 3

Frank E. Adams
INVENTOR

BY Victor J. Evans
ATTORNEY

Patented July 5, 1932

1,866,444

UNITED STATES PATENT OFFICE

FRANK E. ADAMS, OF BLOOMING PRAIRIE, MINNESOTA

ATTACHMENT FOR AUTOMOBILES

Application filed June 26, 1929, Serial No. 373,870. Renewed November 23, 1931.

This invention relates to driving mechanisms for vehicles, an object being to provide means for propelling a vehicle over soft snow and other surfaces where the ordinary driving wheels cannot obtain sufficient traction and sink or dig into the surface.

Another object of the invention is the provision of a driving and traction mechanism for vehicles in which the weight of the traction wheel is utilized to assist in propelling the vehicle.

Another object of the invention is the provision of a traction wheel of novel construction which is especially designed for the purpose above stated.

A further object of the invention is the provision of novel means for mounting the traction wheel and attaching the same to the vehicle.

With the above and other objects in view, the invention further includes the following novel features and details of construction, to be hereinafter more fully described, illustrated in the accompanying drawings and pointed out in the appended claim.

In the drawings:—

Figure 1 is a side elevation of an automobile with the invention applied.

Figure 2 is an enlarged plan view of the traction device showing fragmentary portions of the rear axle housing of the automobile.

Figures 3 and 4 are sections taken respectively on the lines 3—3 and 4—4 of Figure 2.

Figure 5:
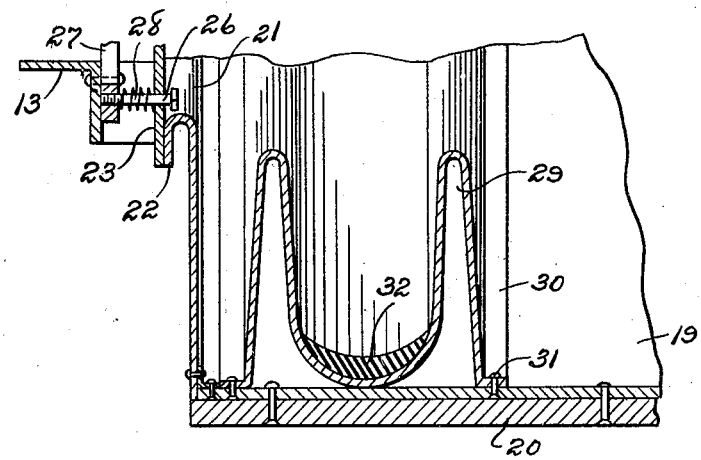

Figure 5 is an enlarged fragmentary section showing a portion of the traction drum.

Figure 6:
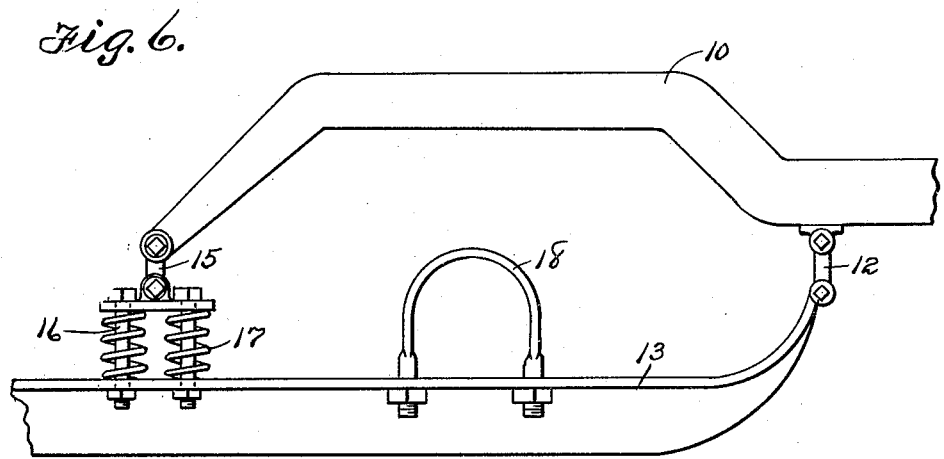

Figure 6 is a fragmentary elevation illustrating the manner of mounting the auxiliary frame.

Figure 7:
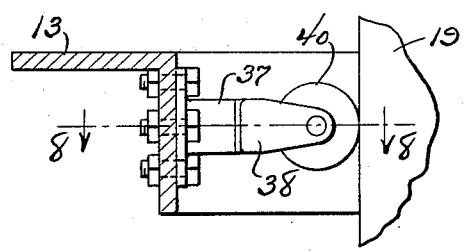

Figure 7 is an enlarged fragmentary section on the line 7—7 of Figure 2.

Figure 8:
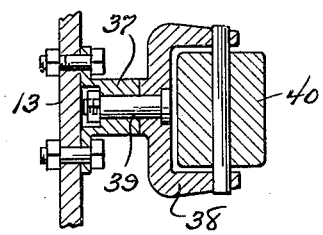

Figure 8 is a section on the line 8—8 of Figure 7.

Referring to the drawings in detail wherein like characters of reference denote corresponding parts, the reference character 10 indicates a portion of the frame of an automobile, the rear axle housing of which is shown at 11.

In carrying out the invention, the spokes of the rear wheels are removed leaving the brake drums which are utilized for braking the vehicle in the usual manner. The rear springs are also removed and secured to the forward shackles 12 of the rear springs is the front end of side bars 13 which are connected by a cross bar 14 and form an auxiliary frame which extends rearwardly from the automobile. The side bars 13 are further connected to the rear ends of the frame 10 by means of shackles 15 and bolts 16, springs 17 being employed to provide a yieldable connection. U-shaped bolts serve to connect the side bars 13 of the auxiliary frame with the rear axle housing 11. The auxiliary frame is thus pivotally and yieldingly connected to the frame 10 of the automobile.

Positioned within the auxiliary frame is a traction drum 19 which is provided upon its periphery with spaced cleats or other traction devices 20, so that the drum may obtain a firm grip in snow or upon ice and other slippery surfaces, while the width and diameter of the drum is such as to prevent the latter from sinking in soft snow.

The drum 19 is provided at its opposite ends with concentrically arranged openings 21, an outwardly extending flange 22 surrounding each of these openings. The openings are closed by plates 23 which are formed of sections 23a and 23b suitably connected together. One of the sections, for example, the section 23b is provided with an opening 24 for the passage of an axle 25 which is eccentrically arranged with respect to the drum and which extends through the drum and through the openings 24 of the plates 23. This axle is mounted in suitable bearings 25a carried by the auxiliary frame.

Extending through the plates 23 are headed bolts 26 which are carried by an annulus 27. This annulus is secured to the side bars 13 of the auxiliary frame, and springs 28 which are mounted upon the bolts 26 between the annulus 27 and the plate 23 serve to yieldingly force the latter against the flange 22. The drum 19 may thus revolve independently of the plates 23 while the latter will be held in position to prevent water, dirt and other extraneous matter from passing into the drum.

Secured within the drum are annular reinforcing members and tracks 29. These tracks are channel shaped in cross section and are slightly flared and are provided with flanges 30 at opposite sides thereof which are secured to the inner face of the drum 19 as shown at 31. The tracks are provided with a rubber or other compressible lining 32 for the purpose of reducing wear upon the traction wheels to be later explained and for increasing the traction qualities. The annular members just described provide combined tracks and reinforcing members for the traction drum.

Secured upon the axle 25 are spaced wheels 33 which may be in the form of ordinary automobile wheels. These wheels operate within the tracks 29 and as they are disposed eccentrically with respect to the drum they will ride upon the inside of the drum and force the latter in a forward direction when the axle 25 is rotated. The weight of the drum will thus be utilized to increase the propelling power.

The axle 25 has secured upon its outer ends sprocket wheels 34 which are driven by chains 35 from sprocket wheels 36 fast upon the rear axle of the automobile.

In order to properly center the drum and prevent wobbling the side bars 13 of the auxiliary frame have secured thereto brackets 37. These brackets are of sectional formation and include an outer bifurcated section 38 which is pivotally mounted as shown at 39 and which carries a roller 40. One of these rollers is positioned at each end of the drum 19 so that the latter will be held in a direct line of travel.

The front wheels 41 of the automobile are arranged within shoes or runners 42 which are suitably secured in place.

The invention is susceptible of various changes in its form, proportions and minor details of construction and the right is herein reserved to make such changes as properly fall within the scope of the appended claim.

Having described the invention what is claimed is:

In a traction device for motor vehicles, a frame adapted to be secured to a vehicle, a traction drum within the frame, an axle extending eccentrically through said drum and mounted in bearings carried by the frame, spaced annular channel-shaped members within the drum, annular flanges extending from said members and secured to the drum and provided with said channel-shaped members, combined tracks and reinforcing members, wheels carried by the axle and positioned within and frictionally engaging the tracks, and means to drive the axle.

In testimony whereof I affix my signature.

FRANK E. ADAMS.